S. G. MASON.
Apparatus for Sawing and Tenoning Spokes.
No. 216,049. Patented June 3, 1879.
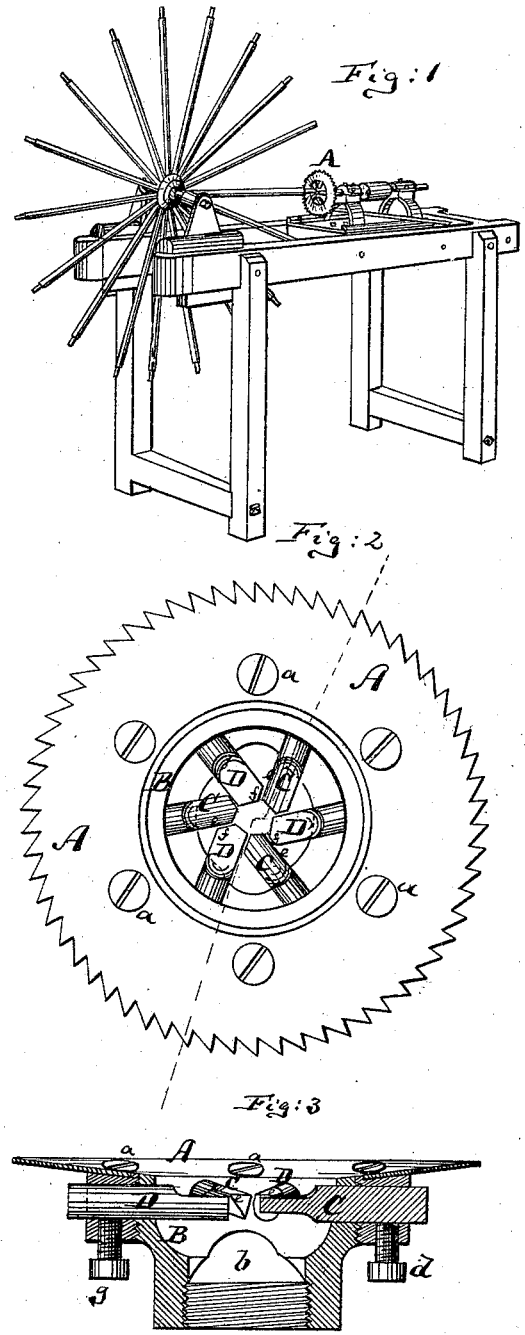
Witnesses:
John C. Tunbridge
Willy J. C. Schlitz
Inventor:
S. G. Mason
by his attorney
A. v. Briesen

UNITED STATES PATENT OFFICE.

SYLVESTER G. MASON, OF CROWN POINT, NEW YORK, ASSIGNOR OF ONE-HALF HIS RIGHT TO CHARLES E. BOGUE, OF SAME PLACE.

IMPROVEMENT IN APPARATUS FOR SAWING AND TENONING SPOKES.

Specification forming part of Letters Patent No. 216,049, dated June 3, 1879; application filed March 21, 1879.

*To all whom it may concern:*

Be it known that I, SYLVESTER G. MASON, of Crown Point, in the county of Essex and State of New York, have invented a new and Improved Apparatus for Sawing and Tenoning Spokes, of which the following is a specification.

Figure 1 is a perspective view of a machine containing my improved apparatus. Fig. 2 is a face view of the sawing and tenoning apparatus; Fig. 3, a central section thereof; Fig. 4, a detail side view of one of the cutters used therein.

Similar letters of reference indicate corresponding parts in all the figures.

This invention relates to the employment of an annular saw in conjunction with a series of inserted bits, and counter-pieces back of and close to said bits, for the purpose of sawing and tenoning the ends of spokes, and for constituting a self-feed during the act of tenoning.

The invention consists in the new arrangement of bits and counter-pieces around a common center, the counter-pieces being close to and slightly back of the bits, and also in their combination with an annular saw, and in other details of improvement, hereinafter more fully described.

In the accompanying drawings, the letter A represents an annular saw-blade, placed against the face of, and secured by screws $a$ or otherwise to, an annular block, B, of iron, steel, or other suitable material, which block is adapted to be screwed upon or otherwise secured to a shaft, to which rotary motion can be imparted. Behind the saw-blade the annular block B has one or more lateral openings, $b$, or apertures, for the discharge of chips or shavings.

C C C are three (more or less) planing or cutting bits, fitted radially through the block B, and adjusted so that their inner ends are equidistant from the center of the saw. Each of these bits can be secured in position by a suitable set-screw, $d$, or otherwise.

Each bit C is provided with a cutting-edge, $e$, which, when properly adjusted, is slightly turned up toward the face of the saw, to project forward of the counter-pieces D D, hereinafter described.

D D D are three (more or less) rods or counter-pieces, placed radially into the block B between the bits C C, in such manner that the end edge $f$ of each rod D will be close to and somewhat behind each cutting-edge—in fact, in the same relative position as the sole of a plane is to the bit thereof. These counter-pieces D are also adjustable, and held in place by set-screws $g$.

In operation the apparatus, mounted upon a shaft, is rotated, and the ends of the spokes of a wheel are successively exposed to its action. The saw cuts the spokes off to the required length, and then, as the cut end of the spoke is opposite the center of the saw, the latter is slid toward the spoke, to enable the cutters C to act on the end of the spoke, making an annular cut, and thus producing a central tenon, which enters the central opening, inclosed by the ends of the cutters and counter-pieces. After the bits have once taken hold of the spoke they feed themselves (owing to the gripe which the counter-pieces D enable them to take) along on the spoke until a stop is reached, which defines the length of tenon. The saw is now moved back, another spoke of the partly-finished wheel exposed to its action, and the tenon produced, as before stated.

Fig. 1 illustrates a machine containing my improved apparatus, and showing also the partly-finished wheel, of which nearly all the spokes have been sawed and tenoned.

I do not claim a block having an inner cutter and radial rests, such as is shown in Patent No. 26,822, nor the combination of such a block with an embracing-saw; but I do claim—

1. The annular block B, combined with two or more radial inwardly-set bits, C C, and an equal number of counter-pieces, D D, set back of and close to the bits, for the purpose of constituting a tenoning apparatus, substantially as herein shown and described.

2. The combination of the annular saw A with the two or more radial bits, C, and an equal number of counter-pieces, D, set back of and close to the bits, to constitute a combined sawing and spoke-tenoning apparatus, substantially as herein shown and described.

3. The annular block B, carrying two or more adjustable bits, C, and the counter-pieces D, set back of and close to the bits C, and provided with lateral apertures $b\ b$, substantially as herein shown and described.

SYLVESTER G. MASON.

Witnesses:
E. J. BARKER,
F. P. FENTON.